US009124948B2

(12) United States Patent
Brandstetter (10) Patent No.: US 9,124,948 B2
(45) Date of Patent: Sep. 1, 2015

(54) SYSTEMS AND METHODS FOR DEFINING AD SPACES IN VIDEO

(71) Applicant: Jeffrey D. Brandstetter, San Francisco, CA (US)

(72) Inventor: Jeffrey D. Brandstetter, San Francisco, CA (US)

(73) Assignee: IPAR, LLC, San Francisco, CA (US)

(*) Notice: Subject to any disclaimer, the term of this patent is extended or adjusted under 35 U.S.C. 154(b) by 11 days.

(21) Appl. No.: 14/204,613

(22) Filed: Mar. 11, 2014

(65) Prior Publication Data

US 2014/0282725 A1 Sep. 18, 2014

Related U.S. Application Data

(60) Provisional application No. 61/789,477, filed on Mar. 15, 2013.

(51) Int. Cl.
| | |
|---|---|
| *H04N 7/10* | (2006.01) |
| *H04N 7/025* | (2006.01) |
| *H04N 21/81* | (2011.01) |
| *H04N 21/435* | (2011.01) |
| *H04N 21/433* | (2011.01) |
| *G06Q 30/02* | (2012.01) |
| *H04N 21/235* | (2011.01) |
| *H04N 21/2343* | (2011.01) |

(52) U.S. Cl.
CPC ............ *H04N 21/812* (2013.01); *G06Q 30/02* (2013.01); *H04N 21/235* (2013.01); *H04N 21/234345* (2013.01); *H04N 21/435* (2013.01); *H04N 21/4331* (2013.01)

(58) Field of Classification Search
None
See application file for complete search history.

(56) References Cited

U.S. PATENT DOCUMENTS

| | | | | |
|---|---|---|---|---|
| 6,085,164 | A * | 7/2000 | Smith et al. | 705/5 |
| 7,039,930 | B1 * | 5/2006 | Goodman et al. | 725/22 |
| 7,844,985 | B2 * | 11/2010 | Hendricks et al. | 725/35 |
| 7,979,318 | B1 * | 7/2011 | Morton et al. | 705/26.1 |
| 8,170,913 | B1 * | 5/2012 | Baluja | 705/14.43 |
| 8,175,941 | B2 * | 5/2012 | Pein | 705/35 |
| 8,175,950 | B1 * | 5/2012 | Grebeck et al. | 705/36 R |
| 8,935,243 | B2 * | 1/2015 | Marshall | 707/727 |
| 2002/0100041 | A1 * | 7/2002 | Rosenberg et al. | 725/32 |
| 2003/0149618 | A1 * | 8/2003 | Sender et al. | 705/14 |
| 2003/0188317 | A1 | 10/2003 | Liew et al. | |
| 2004/0093394 | A1 * | 5/2004 | Weber et al. | 709/219 |
| 2004/0267806 | A1 * | 12/2004 | Lester | 707/103 R |
| 2006/0111968 | A1 * | 5/2006 | Cline et al. | 705/14 |
| 2006/0212350 | A1 * | 9/2006 | Ellis et al. | 705/14 |
| 2008/0097838 | A1 * | 4/2008 | Lin et al. | 705/14 |

(Continued)

OTHER PUBLICATIONS

International Search Report and Written Opinion for PCT/US2014/023146, dated Jul. 15, 2014.

*Primary Examiner* — Jonathan V Lewis
(74) *Attorney, Agent, or Firm* — Jones Day (57) ABSTRACT

Computer-implemented systems and methods are provided for defining ad space in a video. For example, a computer can receive an identification of a video and an advertisement space definition that includes a time stamp for the advertisement space in the video and an advertisement length. The computer can receive a request to view the video. The computer can determine an advertisement to play in the advertisement space such that the advertisement is not longer than the advertisement length included in the video's advertisement space definition. The computer can provide access to the video, and when the video reaches the time stamp, the advertisement is played in the advertisement space.

24 Claims, 4 Drawing Sheets

(56) References Cited

U.S. PATENT DOCUMENTS

| | | | |
|---|---|---|---|
| 2008/0187279 A1* | 8/2008 | Gilley et al. | 386/52 |
| 2008/0250448 A1* | 10/2008 | Rowe et al. | 725/32 |
| 2009/0150930 A1* | 6/2009 | Sherwin et al. | 725/35 |
| 2009/0299832 A1* | 12/2009 | Manchala et al. | 705/14.1 |
| 2009/0313652 A1* | 12/2009 | Connery et al. | 725/32 |
| 2010/0088716 A1* | 4/2010 | Ellanti et al. | 725/32 |
| 2010/0121671 A1* | 5/2010 | Boutilier et al. | 705/8 |
| 2010/0145763 A1* | 6/2010 | Swanson, Sr. | 705/10 |
| 2010/0166389 A1* | 7/2010 | Knee et al. | 386/95 |
| 2010/0174609 A1* | 7/2010 | Bax et al. | 705/14.71 |
| 2010/0257054 A1* | 10/2010 | Martin et al. | 705/14.46 |
| 2010/0324992 A1* | 12/2010 | Birch | 705/14.49 |
| 2011/0107368 A1 | 5/2011 | Rouse et al. | |
| 2011/0145070 A1* | 6/2011 | Wolinsky et al. | 705/14.61 |
| 2011/0289531 A1* | 11/2011 | Moonka et al. | 725/38 |
| 2012/0089456 A1* | 4/2012 | Gupta et al. | 705/14.45 |
| 2013/0124308 A1* | 5/2013 | Hegeman et al. | 705/14.48 |
| 2014/0020017 A1* | 1/2014 | Stern et al. | 725/34 |
| 2014/0082660 A1* | 3/2014 | Zhang et al. | 725/32 |

* cited by examiner

SYSTEMS AND METHODS FOR DEFINING AD SPACES IN VIDEO

This application claims priority to U.S. Provisional Application No. 61/789,477, entitled "Systems and Methods for Defining Ad Spaces in Video," filed Mar. 15, 2013, the entirety of which is herein incorporated by reference.

FIELD

The technology described herein relates generally to video advertisement and more specifically to defining advertisement space in a video.

BACKGROUND

Advertisements are increasingly being displayed to viewers concurrently with a primary content (e.g., a television show, video clip, etc.). Often this takes the form of the advertisement being displayed in a fixed area of the display window, such as at the bottom of the window, and at a fixed time. The inflexibility, however, may often result in a suboptimal advertisement or viewing experience. For example, the advertisement may cover important aspects of the primary content, which may annoy viewers, or it may be displayed during an inopportune time, resulting in viewers paying little attention to the advertisement. Thus, in order to improve the effectiveness of advertisements, a more flexible approach to controlling an advertisement's placement and timing is needed.

SUMMARY

In accordance with the teachings herein, computer-implemented systems and methods are provided for defining ad space in a video. For example, a computer can receive an identification of a video and an advertisement space definition that includes a time stamp for the advertisement space in the video and an advertisement length. The computer can receive a request to view the video. The computer can determine an advertisement to play in the advertisement space such that the advertisement is not longer than the advertisement length included in the video's advertisement space definition. The computer can provide access to the video, and when the video reaches the time stamp, the advertisement is played in the advertisement space.

DETAILED DESCRIPTION

Figure 1:
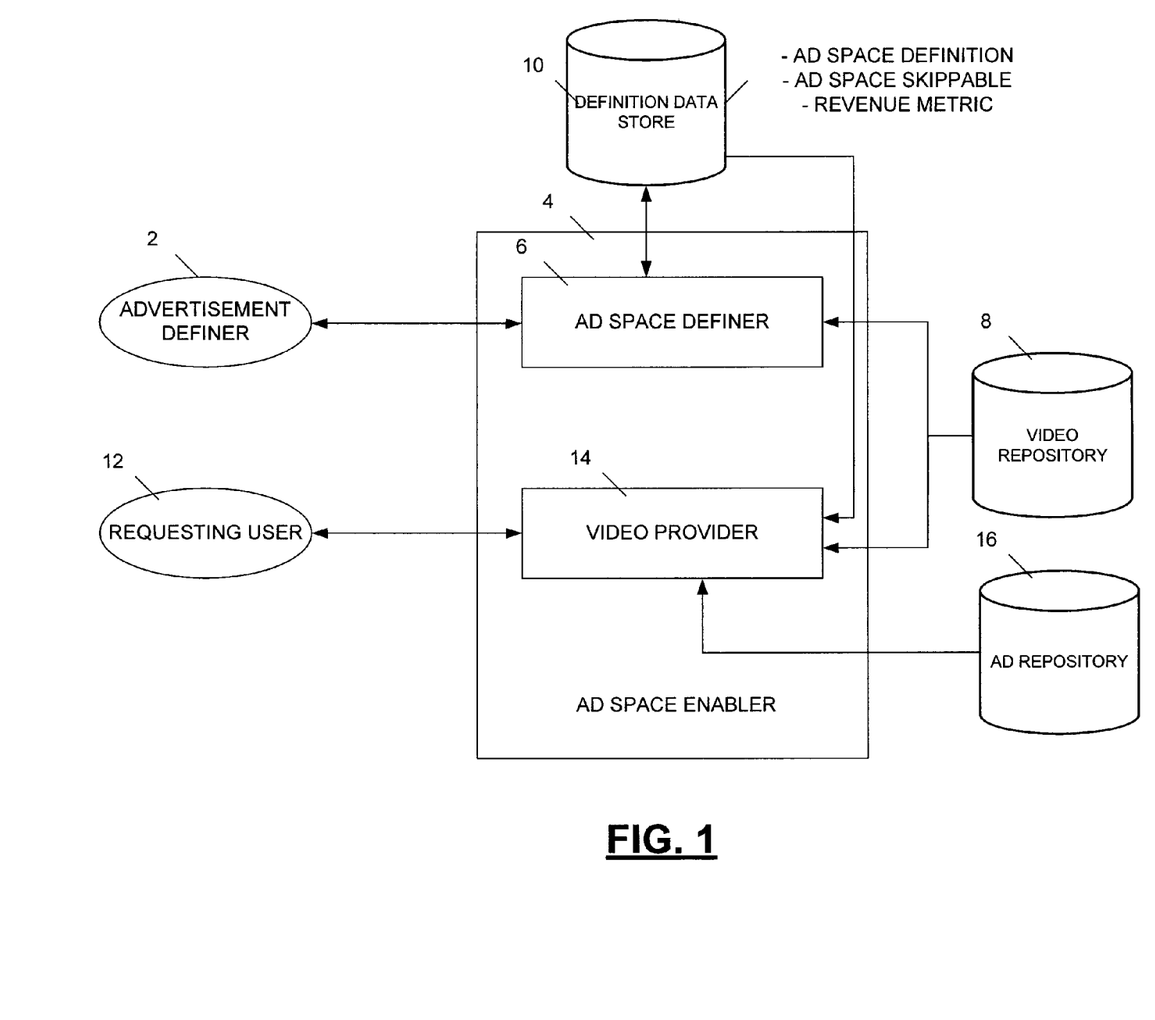
FIG. 1 depicts a computer-implemented environment for defining ad space in a video.

FIG. 1 is a block diagram depicting a computer-implemented ad space enabler 4. An ad space enabler 4 facilitates an advertisement definer 2 to maximize generated revenue for advertisements displayed during a video while not significantly compromising the watchability of the video (e.g., automatically playing a commercial mid-sentence in the video). An advertisement definer 2 accesses an ad space enabler 4 to define advertisement space windows in a video, where advertisements are displayed during the defined advertisement spaces to generate revenue for a rights holder, such as a video creator. An ad space definer 6 receives an identification of a video, such as a video stored in a video repository 8, and an advertisement space definition. The advertisement space definition may include a time stamp of a point in the identified video and an advertisement length. The advertisement space definition is stored in a data store, such as definition data store 10. Upon receiving a request to view the video for which the advertisement space has been defined, such as a request from a requesting user 12, a video provider 14 determines an advertisement from an advertisement repository 16 to play in the advertisement space that has been defined for the requested video. The video provider 14 may consider the advertisement length parameter of the advertisement space definition in selecting the advertisement to be played. For example, the video provider 14 may select an advertisement that is no longer than the advertisement length provided in the advertisement space definition. The video provider 14 provides access to the video, where when the video reaches the time stamp indicated in the advertisement space definition, the advertisement is played within the advertisement space time period.

The advertisements displayed in the advertisement space may take a variety of forms. For example, the advertisement may be a video advertisement. In one example, when the video reaches the time stamp of the advertisement space definition, the video is paused, and the video advertisement is played. The video then resumes upon completion of the video advertisement. In another example, the advertisement is a text or graphic overlay advertisement. The use of a text or graphic overlay advertisement may enable continuous display of the requested video, even during the advertisement space time period.

In some implementations, the advertisement space definition may include a flag that indicates whether advertisements played in the associated advertisement space are permitted to be skipped. For example, the advertisement definer 2 may specify that certain advertisement spaces may be filled with advertisements that can be skipped. While skippable advertisements may produce less revenue, they may encourage continued viewing of the video in those instances where a user might otherwise discontinue viewing upon advertisement presentation. When an advertisement space is flagged as skippable, the advertisement displayed during that space may be stopped or removed upon user request (e.g., by a user clicking a 'skip' link or an 'x' link displayed with the advertisement).

As noted above, the display of advertisements during a video may produce revenue for an entity providing video access, as well as for a rights holder of the particular video being played (e.g., an advertiser pays 3 cents per display of an advertisement, where 1 cent is retained by the entity providing access and 2 cents is paid to the video rights holder per advertisement impression). Revenue per impression of an advertisement during display of a video may vary based on a variety of factors. For example, longer advertisements may earn more revenue than shorter advertisements. Additionally, advertisements that are skipped or only partially viewed may earn less or no revenue. Further, revenue earned may be based on the placement of an advertisement within a video. For example, an advertisement displayed near the climax of a video may earn more revenue than an advertisement placed near the beginning of the video or during the credits of the video, since the level of engagement and likelihood of paying attention to the advertisement is presumably higher at the climax of the video.

With revenue being potentially based on one or more of the timing of an advertisement, the length of an advertisement, and whether an advertisement is skippable, all parameters that may be controlled by an advertisement definer 2, an ad space enabler 4 can provide expected revenue values to the advertisement definer 2 during ad space definition to facilitate more informed advertisement space definition. For example, an ad space definer 6 may provide a graphical user interface to the advertisement definer 2 that displays a video identified by the advertisement definer 2 as well as an expected revenue value. For example, the interface may provide an expected revenue for a current advertisement space being defined or for all of the advertisement spaces defined for the particular video. The expected revenue displayed in the user interface may be displayed and updated in real time as the advertisement definer 2 defines an ad space, such as through modification to the advertisement space's location within a video or modification to the length of the ad space. For example, the advertisement definer 2 may be provided with a depiction of a selected video along with a time line of the video. When the advertisement definer selects a time stamp, such as by clicking on the timeline or typing in a time stamp value, along with an advertisement length, the ad space definer 6 computes an expected revenue, such as an expected revenue per display of the video, based on the advertisement space definition. That expected revenue may be based on the time stamp (e.g., whether the advertisement space is placed at a point of high or low viewer engagement in the video) and the length of the video. The expected revenue may also be based on whether the advertisement space is flagged as skippable. The advertisement definer 2 may iteratively adjust the advertisement space definition, such as based on the displayed expected revenue to maximize expected revenue.

In another example, the advertisement definer 2 may indicate a desired expected revenue, such as via an expected revenue slide bar. When an advertisement definer 2 adjusts the desired expected revenue, one or more parameters of one or more defined advertisement spaces can automatically be adjusted. For example, when an advertisement definer 2 decreases a desired expected revenue, a length of a defined advertisement space may be shortened. In another example, when an advertisement definer 2 commands an increase in the desired expected revenue, a defined advertisement space may be lengthened or moved to a more lucrative position within the video, such as nearer to the climax or other critical scene or important point in the video.

A video provider 14 is responsive to requests to view videos from requesting users 12. For example, a requesting user 12 may indicate interest in viewing a video through clicking on a link on a social media site, in an e-mail, or on a website. The video provider 14 receives the request and accesses the definition data store 10 to determine whether any advertisement spaces have been defined for the selected video. If an advertisement space has been defined, the video provider 14 selects an appropriate advertisement from an advertisement repository 16 based on the parameters of the ad space definition. For example, the video provider 14 may base its advertisement selection based on one or more of the length of the advertisement space specified in the advertisement space definition, the type of advertisement specified in the advertisement space definition (e.g., a graphic overlay advertisement or a potentially more lucrative video advertisement), or any content restrictions on the advertisement (e.g., an advertisement definer 2 could specify that a "Mature" advertisement should not be played during an advertisement space defined in a "Children's" video). The video provider 14 then provides access to the video, where when the video reaches the time stamp of a defined advertisement space, the advertisement is played in the advertisement space. An account of the video provider and the video rights holder may be credited upon display of an advertisement. For example, accounts may be credited after completion of display of an advertisement. In another example, accounts may be credited when the video reaches the time stamp. In a further example, the accounts may be credited only when the advertisement is played for the full length, or the accounts may be played for a partial amount (e.g., a pro rata share when an advertisement is partially displayed or skipped).

While the examples described herein are directed to definition of advertisement spaces within videos, the systems and methods apply to other content types as well. For example, advertisement spaces can be defined in content that is audio, video, still image, or hybrid combinations thereof.

Figure 2:
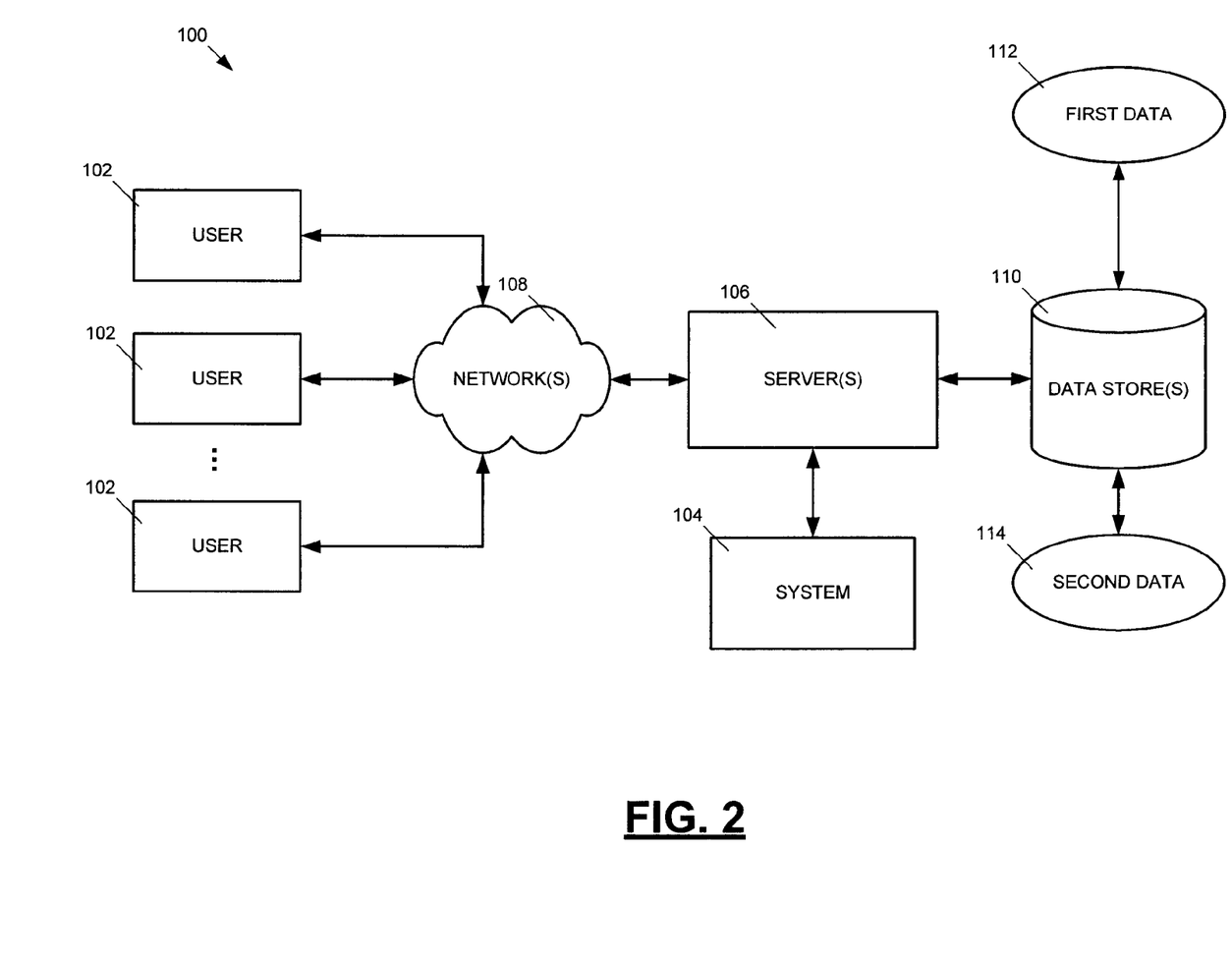
FIG. 2 depicts a computer-implemented environment for a user to access an ad space enabler through a network.

FIG. 2 depicts at 100 a computer-implemented environment wherein users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user.

Figure 3A:
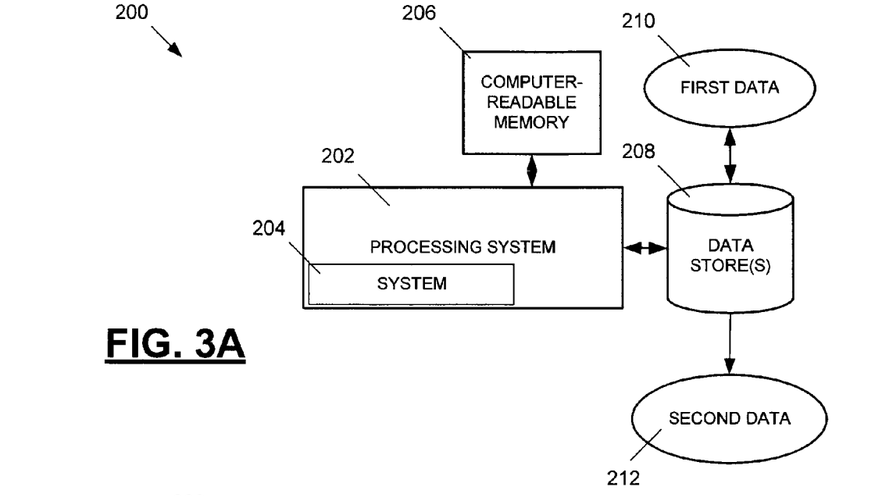
FIGS. 3A, 3B, and 3C depict example systems for use in implementing an ad space enabler.
Figure 3B:
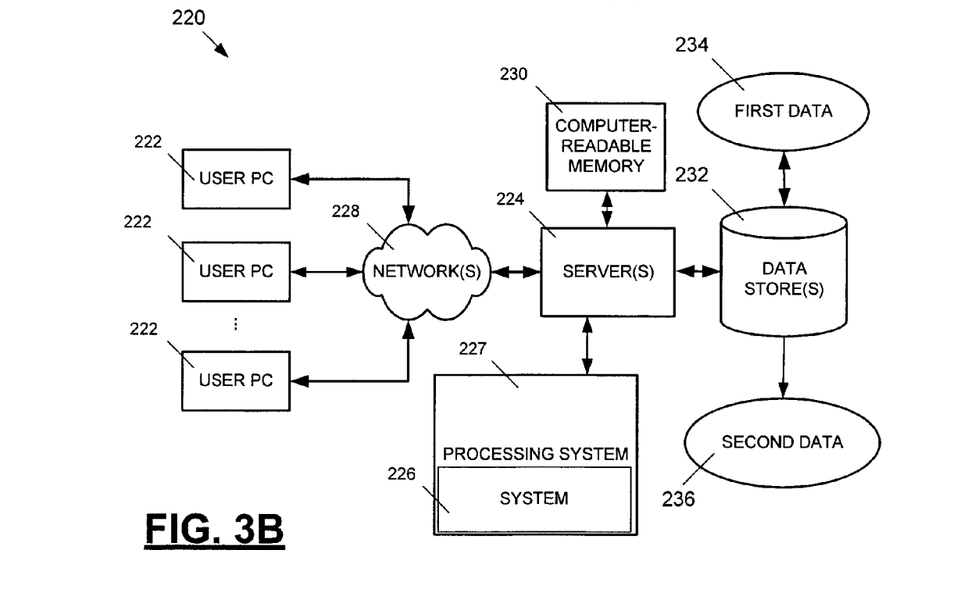
Figure 3C:
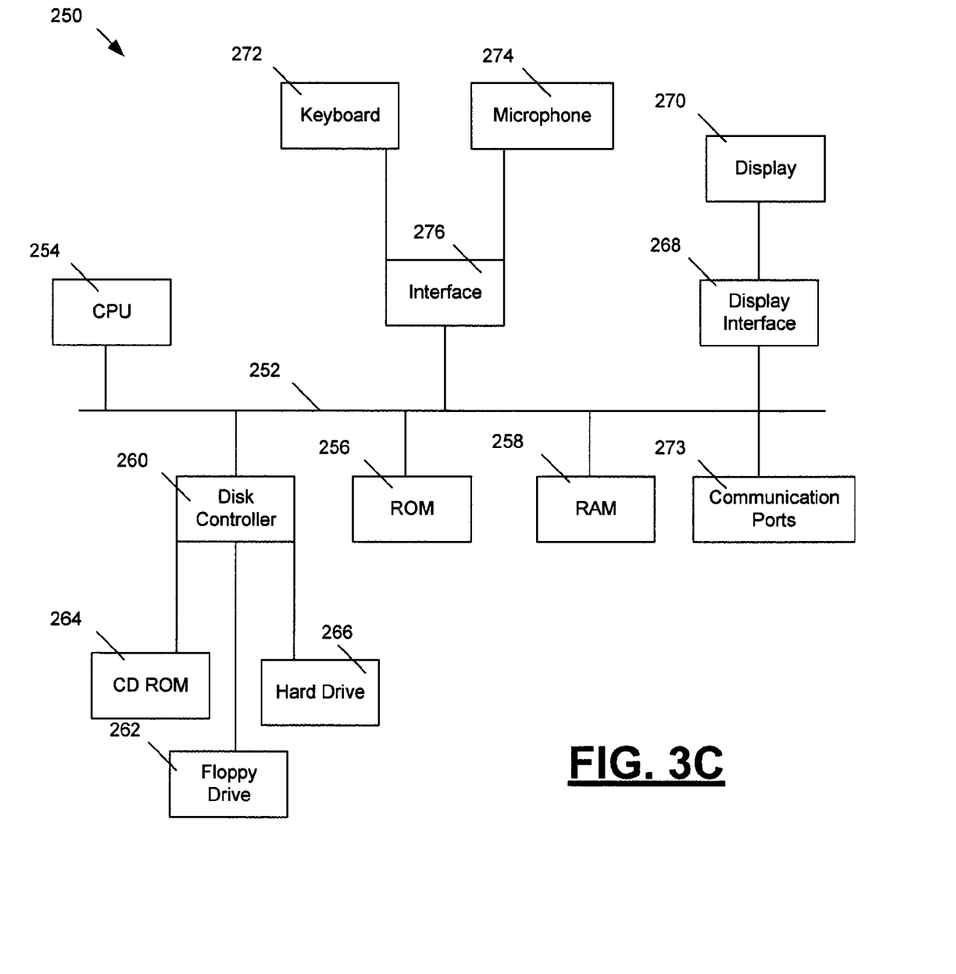

FIGS. 3A, 3B, and 3C depict example systems for use in implementing a system. For example, FIG. 3A depicts an exemplary system 200 that includes a stand alone computer architecture where a processing system 202 (e.g., one or more computer processors) includes a system 204 being executed on it. The processing system 202 has access to a computer-readable memory 206 in addition to one or more data stores 208. The one or more data stores 208 may contain first data 210 as well as second 212.

FIG. 3B depicts a system 220 that includes a client server architecture. One or more user PCs 222 accesses one or more servers 224 running a system 226 on a processing system 227 via one or more networks 228. The one or more servers 224 may access a computer readable memory 230 as well as one or more data stores 232. The one or more data stores 232 may contain first data 234 as well as second data 236.

FIG. 3C shows a block diagram of exemplary hardware for a stand alone computer architecture 250, such as the architecture depicted in FIG. 3A, that may be used to contain and/or implement the program instructions of system embodiments of the present invention. A bus 252 may serve as the information highway interconnecting the other illustrated components of the hardware. A processing system 254 labeled CPU (central processing unit) (e.g., one or more computer processors), may perform calculations and logic operations required to execute a program. A processor-readable storage medium, such as read only memory (ROM) 256 and random access memory (RAM) 258, may be in communication with the processing system 254 and may contain one or more programming instructions. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 273.

In addition to the standard computer-type components, the hardware may also include data input devices, such as a keyboard 272, or other input device, such as a microphone 274, remote control, pointer, mouse and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, interne, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A method of defining revenue generating ad spaces in media content, comprising:
   receiving an identification of media content and an advertisement space definition, wherein the advertisement space definition includes a time stamp for the advertisement space in the media content and an advertisement length;
   providing a graphical user interface that displays an identification of the identified media content and an expected revenue value associated with the advertisement space definition based on a positioning of the time stamp within the identified media content, wherein the graphical user interface includes a timeline associated with the media content and an indication of the time stamp within the timeline, wherein the expected revenue value indicates a value to be received in exchange for playing an advertisement in the defined advertisement space, wherein the expected revenue is displayed on the graphical user interface simultaneously with an indication of the advertisement space definition within the timeline, wherein the expected revenue and the timeline are updated in real-time based on adjustments to the advertisement space definition;
   receiving an adjustment to the time stamp of the advertisement space definition via the timeline;
   displaying an update to the expected revenue value on the graphical user interface based on the time stamp adjustment;
   receiving a request to view the media content;
   determining an advertisement to play in the advertisement space, wherein the advertisement is not longer than the advertisement length; and
   providing access to the media content, wherein when the media content reaches the time stamp, the advertisement is played in the advertisement space.

2. The method of claim 1, wherein the media content is video content, audio content, image content, or mixed media content.

3. The method of claim 1, wherein the media content is video content.

4. The method of claim 1, wherein the advertisement is a video advertisement.

5. The method of claim 3, wherein video is paused while the video advertisement is played.

6. The method of claim 3, wherein the advertisement is an overlay advertisement, wherein the video is not paused while the overlay advertisement is displayed.

7. The method of claim 1, wherein the advertisement space definition includes an indication as to whether the advertisement played in the ad space is skippable.

8. The method of claim 1, wherein when the advertisement is skippable, the advertisement can be stopped, removed, or bypassed upon user request.

9. The method of claim 1, wherein the expected revenue value is based on the advertisement length, wherein the expected revenue value is larger for longer advertisement lengths than for shorter advertisement lengths.

10. The method of claim 1, wherein the expected revenue value is larger when the advertisement is not flagged as skippable.

11. The method of claim 1, wherein the expected revenue value is an expected revenue per view of the video, revenue per thousand displays (CPM), revenue per user action, or revenue per click on the advertisement.

12. The method of claim 1, wherein the graphical user interface includes an expected revenue adjustment control, wherein a length of the advertisement space is automatically adjusted based on an adjustment received via the revenue adjustment control.

13. The method of claim 3, wherein providing access to the video includes automatically selecting the advertisement from an advertisement repository based on the advertisement length of the advertisement space definition.

14. The method of claim 3, wherein the advertisement space definition further includes an advertisement content restriction, wherein providing access to the video includes automatically selecting the advertisement from an advertisement repository that complies with the advertisement content restriction.

15. The method of claim 3, further comprising:
crediting an account after completion of the advertisement space.

16. The method of claim 15, wherein the account is credited with an amount of money or other form of compensation when the video reaches the time stamp.

17. The method of claim 15, wherein the account is credited with an amount of money or other form of compensation when the advertisement is played for its full length.

18. The method of claim 15, wherein the account is credited with a partial view amount of money or other form of compensation when the advertisement is skipped.

19. The method of claim 1, wherein no advertisements are displayed outside of defined advertisement spaces.

20. The method of claim 3, wherein access to the video is provided by a different entity or person than an entity or person that provided the advertisement space definition.

21. A system for defining revenue generating ad spaces in a video, comprising:
one or more data processors;
one or more computer-readable mediums encoded with instructions for commanding the one or more data processors to execute steps that include:
receiving an identification of media content and an advertisement space definition, wherein the advertisement space definition includes a time stamp for the advertisement space in the media content and an advertisement length;
providing a graphical user interface that displays an identification of the identified media content and an expected revenue value associated with the advertisement space definition based on a positioning of the time stamp within the identified media content, wherein the graphical user interface includes a timeline associated with the media content and an indication of the time stamp within the timeline, wherein the expected revenue value indicates a value to be received in exchange for playing an advertisement in the defined advertisement space, wherein the expected revenue is displayed on the graphical user interface simultaneously with an indication of the advertisement space definition within the timeline, wherein the expected revenue and the timeline are updated in real-time based on adjustments to the advertisement space definition;
receiving an adjustment to the time stamp of the advertisement space definition via the timeline;
displaying an update to the expected revenue value on the graphical user interface based on the time stamp adjustment;
receiving a request to view the media content;
determining an advertisement to play in the advertisement space, wherein the advertisement is not longer than the advertisement length; and
providing access to the media content, wherein when the media content reaches the time stamp, the advertisement is played in the advertisement space.

22. A non-transitory computer-readable medium encoded with instructions for commanding one or more data processors to execute steps for defining revenue generating ad spaces in a video, comprising:
receiving an identification of media content and an advertisement space definition, wherein the advertisement space definition includes a time stamp for the advertisement space in the media content and an advertisement length;
providing a graphical user interface that displays an identification of the identified media content and an expected revenue value associated with the advertisement space definition based on a positioning of the time stamp within the identified media content, wherein the graphical user interface includes a timeline associated with the media content and an indication of the time stamp within the timeline, wherein the expected revenue value indicates a value to be received in exchange for playing an advertisement in the defined advertisement space, wherein the expected revenue is displayed on the graphical user interface simultaneously with an indication of the advertisement space definition within the timeline, wherein the expected revenue and the timeline are updated in real-time based on adjustments to the advertisement space definition;
receiving an adjustment to the time stamp of the advertisement space definition via the timeline;
displaying an update to the expected revenue value on the graphical user interface based on the time stamp adjustment;
receiving a request to view the media content;
determining an advertisement to play in the advertisement space, wherein the advertisement is not longer than the advertisement length; and
providing access to the media content, wherein when the media content reaches the time stamp, the advertisement is played in the advertisement space.

23. A method of defining revenue generating ad spaces in media content, comprising:
receiving an identification of media content and an advertisement space definition, wherein the advertisement space definition includes a time stamp for the advertisement space in the media content and an advertisement length;
providing a graphical user interface that displays an identification of the identified media content and an expected revenue value associated with the advertisement space definition based on a positioning of the time stamp within the identified media content, wherein the graphical user interface includes a timeline associated with the media content and an indication of the time stamp within the timeline;
receiving an adjustment to the time stamp of the advertisement space definition via the timeline;

calculating a time difference between the adjusted time stamp and a preidentified climax, wherein the preidentified climax is a point in or portion of the media content that is after the beginning of the media content;

displaying an update to the expected revenue value on the graphical user interface based on the determined time difference, wherein the expected revenue value is increased when the time stamp is adjusted closer to the preidentified climax time within the media content;

receiving a request to view the media content;

determining an advertisement to play in the advertisement space, wherein the advertisement is not longer than the advertisement length; and providing access to the media content, wherein when the media content reaches the time stamp, the advertisement is played in the advertisement space.

24. A method of defining revenue generating ad spaces in media content, comprising:

receiving an identification of media content and an advertisement space definition, wherein the advertisement space definition includes a time stamp for the advertisement space in the media content and an advertisement length;

providing a graphical user interface that displays an identification of the identified media content and an expected revenue value associated with the advertisement space definition based on a positioning of the time stamp within the identified media content, wherein the graphical user interface includes a timeline associated with the media content and an indication of the time stamp within the timeline, wherein the expected revenue value indicates a value to be received in exchange for playing an advertisement in the defined advertisement space, wherein the expected revenue is displayed on the graphical user interface simultaneously with an indication of the advertisement space definition within the timeline, wherein the expected revenue and the timeline are updated in real-time based on adjustments to the advertisement space definition;

receiving an adjustment to the time stamp of the advertisement space definition via the timeline;

calculating a time difference between the adjusted time stamp and a preidentified climax, wherein the preidentified climax is a point in or portion of the media content that is after the beginning of the media content;

displaying an update to the expected revenue value on the graphical user interface based on the determined time difference, wherein the expected revenue value is increased when the time stamp is adjusted closer to the preidentified climax time within the media content;

receiving a request to view the media content;

determining an advertisement to play in the advertisement space, wherein the advertisement is not longer than the advertisement length; and providing access to the media content, wherein when the media content reaches the time stamp, the advertisement is played in the advertisement space.

\* \* \* \* \*